Dec. 15, 1936.  S. BARKER  2,064,403
FILTER
Filed June 24, 1935
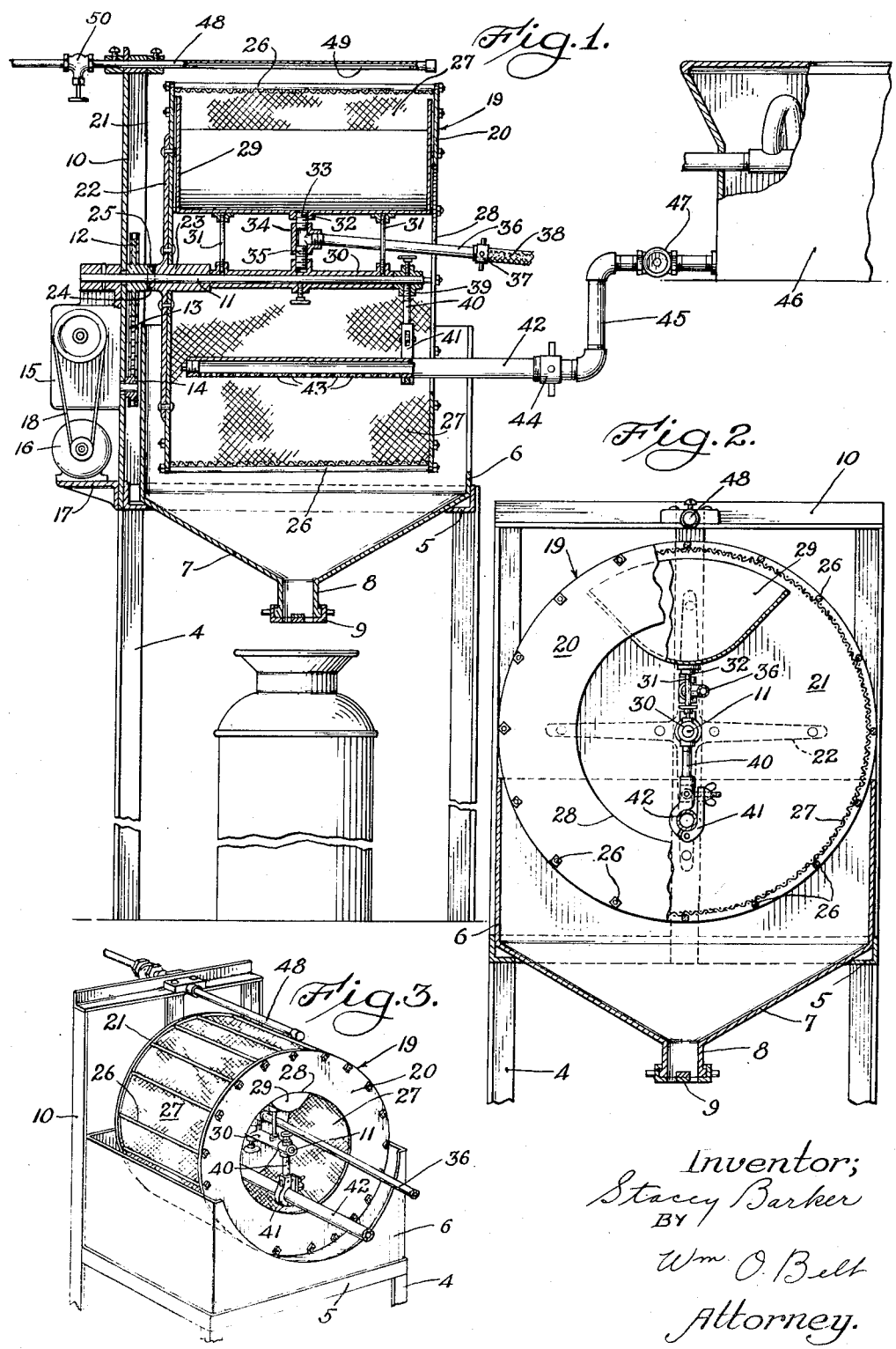
Inventor;
Stacey Barker
BY
Wm O. Belt
Attorney.

Patented Dec. 15, 1936

2,064,403

UNITED STATES PATENT OFFICE 2,064,403

FILTER

Stacey Barker, Superior, Nebr., assignor to Cherry-Burrell Corporation, Chicago, Ill., a corporation of Delaware Application June 24, 1935, Serial No. 28,121

5 Claims. (Cl. 210—199)

This invention relates to filters of the kind adapted for removing casein, dirt and other objectionable matter from cream before it is churned or otherwise processed to thereby improve the quality, purity and flavor of the butter or other dairy product made from the cream.

While cream is carefully handled after it is received at the creamery in an endeavor to comply with the stringent pure food regulations, it has nevertheless been found that off flavor and otherwise objectionable butter or other dairy product is sometimes produced and this is believed to be due to the presence of foreign matter collected in the cream prior to the time it is delivered to the creamery. It is difficult to remove small insects and other foreign matter sometimes found in cream and this is true particularly if the cream is subjected to substantial agitation before it is treated to remove objectionable foreign matter because agitation of the cream tends to break up the insects and other foreign matter into fine particles which freely pass through filters of a fineness sufficient to permit the free passage of the desirable constituents in cream. In view of this, cream should be filtered before it is subjected to substantial agitation and it is advantageous to do this as soon as possible after the cream is received at the creamery for the filtered cream may then be so handled in the creamery that contamination thereof may be prevented. It is therefore the primary object of my invention to filter cream prior to the time it is subjected to substantial agitation to thereby free the cream of objectionable foreign matter so that contamination of the cream may be prevented by subsequent careful handling.

It is advantageous to filter cream as a continuous operation, that is to say, without interrupting the filtering operation to permit changing filtering members and the like. Moreover, the temperature of cream may be raised so as to impart free flowing consistency thereto whereby the desirable constituents in cream will freely pass through a filtering member but objectionable foreign matter will be trapped. It is therefore another object of my invention to filter cream after the temperature thereof has been raised sufficiently to impart free flowing consistency thereto whereby the cream may be passed through a filter of sufficient fineness to remove objectionable foreign matter without removing the desirable constituents in the cream.

Further objects are to pass heated cream through a moving filter which will collect and carry away filtered out matter; to remove filtered out matter from the filter so that the filter may be passed back to filtering position free from objectionable foreign matter and capable of performing the filtering operation efficiently; to continuously discharge the removed foreign matter so that a sanitary condition may be maintained in the filter whereby the filter may be operated continuously without likelihood of contaminating the cream; and to provide a filter of simple and economical construction and efficient and positive operation and which may be expeditiously cleansed after each use thereof so that it may be maintained in a sterile condition.

A selected embodiment of my invention is illustrated in the accompanying drawing wherein Fig. 1 is a vertical sectional view of a filter embodying my invention and in which one form of means for raising the temperature of the cream to impart a free flowing consistency thereto is fragmentally illustrated;

Fig. 2 is a fragmentary end elevational view of the filter shown in Fig. 1 and in which certain parts are broken away; and Fig. 3 is a fragmentary perspective view of the filter.

In the form of my invention illustrated in the accompanying drawing, 4 indicates a frame which may be made conveniently of suitably joined angle iron. The frame provides a bed 5 for supporting a collecting pan 6 having a substantially funnel-shaped bottom 7 including an outlet 8 in which a suitable valve 9 may be arranged to control flow through the outlet 8. A conduit or other suitable means may be connected to the outlet 8 to lead cream collected in the pan 6 to a storage vat or the like or, as illustrated, a can or other collecting member may be disposed below the outlet to collect cream flowing past the opened valve 9.

An upright support 10 is provided at one side of the frame 4 and one end of an axle 11 is fast therein. A sprocket 12 is mounted on the axle 11 and a chain 13 is directed about this sprocket and the sprocket 14 of the speed reducing device 15 carried by the support 10. A motor 16 is mounted on a bracket 17 carried by the frame 4 and a belt 18 or other power transmitting means connects the motor to the speed reducing device 15. When the motor 16 is set in operation the sprocket 12 is rotated at a slow rate of speed.

A filtering drum, generally indicated by 19, includes end plates 20 and 21. A reenforcing plate 22 is fast to the end plate 21 and supports a hub 23 that is rotatably mounted on the axle 11.

Clutch teeth 24 are provided at one end of the hub 23 which mesh with clutch teeth 25 on the hub of the sprocket 12, and when these clutch teeth are engaged the hub 23 and the drum 19 are rotated with the sprocket when this sprocket is set in operation.

A plurality of rods 26 extend between and are secured in the peripheral marginal portions of the end plates 20 and 21. A fine mesh screen 27 extends between the end plates 20 and 21 beneath but in contact with the rods 26.

As best shown in Fig. 3, a medially located opening 28 of substantial size is provided in the end plate 20 through which access to the interior of the drum 19 is afforded. A trough 29 is passed into the drum 19 through this opening 28 to be disposed in the upper part of the drum. A sleeve 30 is fitted onto the axle 11 and one end thereof abuts the hub 23 and supporting studs 31 extend between the sleeve 30 and the bottom of the trough 29 to support the trough in the drum.

A boss 32 depends from the lower part of the trough 29 substantially midway in the extent thereof and has a tapped opening therein into which a nipple 33 is fitted. The nipple 33 leads to a T-fitting 34 and another nipple 35 interconnects the T-fitting with a boss on the sleeve 30 to afford additional support for the trough 29. A conduit 36 leads from the T-fitting 34 through the opening 28 and terminates exteriorly of the drum. A hose coupling 37 connects the free end of the conduit 36 to a hose 38 or the like which leads to a suitable drain for a purpose which will be explained more fully hereinafter.

A clamp 39 is mounted on the axle 11 and abuts one end of the sleeve 30 and the abutment of this clamp with the sleeve and the abutment of the sleeve with the hub 23 holds the clutch teeth 24 and 25 in engagement, and the clamp is tightly secured to the axle 11 to maintain this engagement.

A stud 40 depends from the clamp 39 and carries a suitable clamp 41 which detachably engages and supports a discharge pipe 42 in the lower part of the drum 19. The discharge pipe 42 has a plurality of downwardly facing openings 43 in the portion thereof disposed in the drum 19 and the inner end of this pipe is suitably closed. A coupling 44 at the outer free end of the pipe 42 connects a conduit 45 or the like to the pipe 42. The conduit 45 leads from a forewarmer 46 or other suitable means into which cream may be introduced to be heated sufficiently to impart free flowing consistency thereto. A valve 47 or the like may be provided in the conduit 45 to regulate the flow of cream from the forewarmer 46 or the like to the conduit 42. Cream flowing through the conduit 42 is discharged through the openings 43 and collects in the lower part of the drum 19. This cream filters through the fine wire mesh screen 27 which acts to collect objectionable foreign matter on the inner surface thereof. The cream which passes through the screen 27 is collected in the pan 6 to be discharged therefrom in the manner described. Inasmuch as the drum 19 is rotating, successive portions of the screen 27 progressively move into filtering position and likewise those portions of the screen through which cream has passed successively move out of filtering position. Any cream adhering to the screen as it is moved from contact with the cream collected at the bottom of the drum drains back freely since the screen is positioned inwardly of the rods and therefore the rods do not interfere with such drainage. In this way fat losses are reduced to a minimum for cream does not collect about the rods and is not washed away when the screen is cleansed.

Objectionable foreign matter, such as insects, casein, curd and the like, which have collected on the inner surface of the screen 27, move therewith toward the upper part of the drum 19 and into alignment with the trough 29. A pipe 48 is fast in the support 10 and extends across the upper part of the drum 19 in alignment with the trough 29. A slot 49 or other suitable outlet is provided in that portion of the pipe facing the drum 19. Water or other suitable cleansing medium is admitted into the pipe 48 past the open valve 50 and is discharged through the slot 49. This water flows through that part of the screen 27 aligned with the trough 29 and washes the foreign matter collected on the screen therefrom and this water and the foreign matter washed from the screen pass into the trough 29 from whence it flows through the nipple 33, fitting 34, conduit 36 and hose 38 to a suitable drain.

From the foregoing description it will be apparent that I have provided a novel means and method for filtering cream prior to the time it is subjected to substantial agitation. The method consists in introducing the cream into a device for raising the temperature thereof sufficiently to impart free flowing consistency thereto. This heated or warmed cream is then admitted into a filter and, in the illustrated form of the invention, is passed through a screen so that curd, casein, insects and other objectionable foreign matter are collected on the screen while the desirable constituents in the cream freely flow through the screen and are collected and subsequently so handled that contamination thereof is prevented. Inasmuch as the screen is provided on the periphery of a rotating drum, fresh portions of the screen are successively presented to the cream at filtering position and therefore the filtering operation may be carried out in an efficient manner. Moreover, those portions of the screen through which cream has passed and on which foreign matter and the like has collected are moved from the filtering position into a position whereat the objectionable foreign matter and the like may be removed therefrom so that when these portions of the screen move back into filtering position they will be clean and enabled to efficiently perform the filtering operation.

Another important feature of my invention is that the parts of the filter may be disassembled and sterilized for when the valve 50 is closed and the couplings 37 and 44 are disconnected the remaining parts may be easily and quickly removed. Thus by opening the clamp 41 the pipe 42 may be removed and then when the clamp 39 is released from the axle 11 this clamp may be slid from the axle as well as the sleeve 30 and the hub 23 of the drum which enables the trough 29 and the drum to be removed and therefore all of the parts with which the cream comes in contact may be removed and sterilized.

The operation may be carried on continuously for the reason that the filter or screen is constantly cleaned and in addition to this foreign matter removed from the cream is washed from the screen and is collected in the trough 29 and the water which effected the removal of this foreign matter washes it from the trough through the conduit 36 and hose 38 to a drain.

Since foreign matter is constantly removed from the filter the likelihood of contamination of the cream is reduced to a minimum.

While I have illustrated and described a selected embodiment of my invention it is to be understood that this is capable of variation and modification and I therefore do not wish to be limited to the precise details set forth but desire to avail myself of such changes and alterations as fall within the spirit and scope of the following claims.

I claim:

1. In a filter of the class described, an axle, a drum having a hub at one end thereof rotatably mounted on said axle and having an opening in the other end thereof, a fine mesh screen on the periphery of said drum and adapted to collect objectionable matter from a substance passed therethrough, means for introducing a substance to be filtered into said drum for passage through said screen and including means extending into said drum through said opening and supported by said axle, a rotatable member mounted on said axle and including means adapted to be detachably connected to said hub to rotate said drum and successively withdraw portions of said screen from association with the substance to be filtered and to successively present other portions of said screen to the substance to be filtered, means positioned exteriorly of said drum for directing a fluid through the portions of said screen withdrawn from association with the substance to be filtered to thereby remove objectionable matter collected on said screen, a sleeve disposed about said axle and engaged with said hub to retain said hub in engagement with the means on said rotatable member, a trough in said drum carried by said sleeve and disposed below the means positioned exteriorly of said drum and adapted to collect the fluid and the objectionable matter removed from the screen, and means leading from said trough through said opening for discharging the collected fluid and objectionable matter from the drum.

2. In a filter of the class described, an axle, a drum having a hub at one end thereof rotatably mounted on said axle and having an opening in the other end thereof, a fine mesh screen on the periphery of said drum and adapted to collect objectionable matter from a substance passed therethrough, a pipe extending into said drum through said opening and having a plurality of openings therein for discharging a substance to be filtered onto said screen, a clamp on said axle and including means for supporting said pipe, a rotatable member mounted on said axle and including clutch means adapted to engage clutch means on said hub to rotate said drum and successively withdraw portions of said screen from association with the substance to be filtered and to successively present other portions of said screen to the substance to be filtered, means positioned exteriorly of said drum for directing a fluid through the portions of said screen withdrawn from association with the substance to be filtered to thereby remove objectionable matter collected on said screen, a sleeve disposed about said axle between said hub and said clamp and adapted to retain said clutch means in engagement with each other, a trough in said drum carried by said sleeve and disposed below the means positioned exteriorly of said drum and adapted to collect the fluid and objectionable matter removed from the screen, and means leading from said trough through said opening for discharging the collected fluid and objectionable matter from the drum.

3. In a filter of the class described, an axle, a drum having a hub at one end thereof rotatably mounted on said axle and having an opening at the other end thereof about said axle, a filtering member on the periphery of said drum and adapted to collect objectionable matter from a substance passed therethrough, pipe means extended into said drum through said opening and arranged to introduce a substance to be filtered into said drum, means mounted on said axle for supporting said pipe means in said drum, and means for rotating said drum about said axle to successively withdraw portions of said filtering member from association with the substance to be filtered and to successively present other portions of said filtering member to the substance to be filtered.

4. In a filter of the class described, an axle, a drum having a hub at one end thereof rotatably mounted on said axle and having an opening at the other end thereof about said axle, a filtering member on the periphery of said drum and adapted to collect objectionable matter from a substance passed therethrough, means extended through said opening for introducing a substance to be filtered into said drum, driving means, clutch means on said driving means, clutch means on said hub, and means mounted on said axle and engaged with said hub for retaining the clutch means on said hub in engagement with the clutch means on said driving means to connect said drum to said driving means for operation with said driving means, the means mounted on said axle being removable therefrom to permit removal of said hub from said axle to enable cleaning of the filtering member on said drum.

5. In a filter of the class described, an axle, a drum having a hub at one end thereof rotatably mounted on said axle and having an opening at the other end thereof about said axle, a filtering member on the periphery of said drum and adapted to collect objectionable matter from a substance passed therethrough, means extended through said opening for introducing a substance to be filtered into said drum, driving means connected to said drum for imparting rotative movement thereto, means positioned exteriorly of said drum for directing a fluid through said filtering member to remove objectionable matter therefrom, a trough in said drum below the means positioned exteriorly thereof for collecting the fluid and matter removed from said filtering member, and means mounted on said axle and supporting said trough in said drum.

STACEY BARKER.